United States Patent
Yoon

(10) Patent No.: US 11,499,906 B2
(45) Date of Patent: Nov. 15, 2022

(54) COUPLING DEVICE FOR MASK TEST MEANS

(71) Applicant: APM ENGINEERING CO., LTD., Bucheon-si (KR)

(72) Inventor: Gwan Hoon Yoon, Paju-si (KR)

(73) Assignee: APM ENGINEERING CO., LTD., Bucheon-si (KR)

(*) Notice: Subject to any disclaimer, the term of this patent is extended or adjusted under 35 U.S.C. 154(b) by 305 days.

(21) Appl. No.: 16/755,555

(22) PCT Filed: Oct. 18, 2018

(86) PCT No.: PCT/KR2018/012326
§ 371 (c)(1),
(2) Date: Apr. 10, 2020

(87) PCT Pub. No.: WO2019/078635
PCT Pub. Date: Apr. 25, 2019

(65) Prior Publication Data
US 2021/0190667 A1    Jun. 24, 2021

(30) Foreign Application Priority Data
Oct. 20, 2017  (KR) .................. 10-2017-0136304

(51) Int. Cl.
*A62B 18/02*    (2006.01)
*G01N 15/08*    (2006.01)

(52) U.S. Cl.
CPC ......... *G01N 15/0806* (2013.01); *A62B 18/02* (2013.01); *G01N 2015/084* (2013.01)

(58) Field of Classification Search
CPC .. A62B 18/02; A62B 27/00; G01N 2015/084; G01N 15/0806
See application file for complete search history.

(56) References Cited

U.S. PATENT DOCUMENTS

| | | | |
|---|---|---|---|
| 2010/0212670 A1 | 8/2010 | Amighi et al. | |
| 2011/0138884 A1* | 6/2011 | Hanson | G01M 3/20 73/40 |
| 2016/0166859 A1* | 6/2016 | Rachapudi | A62B 18/02 128/205.27 |
| 2019/0290944 A1* | 9/2019 | O'Donnell | G01D 11/30 |
| 2021/0386135 A1* | 12/2021 | Shiraishi | A62B 18/02 |

FOREIGN PATENT DOCUMENTS

| | | |
|---|---|---|
| CN | 106738039 A | 5/2017 |
| JP | 09-152397 A | 6/1997 |
| KR | 10-2002-0064885 A | 10/2002 |
| KR | 10-2015-0068712 A | 6/2015 |
| KR | 10-1843899 B1 | 3/2018 |

* cited by examiner

Primary Examiner — Tajash D Patel
(74) Attorney, Agent, or Firm — Maschoff Brennan

(57) ABSTRACT

A coupling device for a mask test means is disclosed. Provided according to an embodiment of the present invention is a coupling device for a mask test means, comprising: a pressing member which can receive a first member of a mask test means on one side thereof and can move up and down; and a support member which can receive a second member of the mask test means on one side thereof and is disposed below the pressing member, wherein the support member includes a lower member having a perforation means for forming a perforation in a mask, and the pressing member includes an upper member into which at least a portion of the perforation means can be inserted.

8 Claims, 3 Drawing Sheets

COUPLING DEVICE FOR MASK TEST MEANS

TECHNICAL FIELD

The present invention relates to a coupling device for a mask test means.

BACKGROUND ART

In general, dust or harmful gas, bacteria, etc. may enter the respiratory organ of a worker, causing diverse industrial accidents on work sites such as plants where dust or harmful gas is generated (for example, paper factories, textile factories, etc.), quarries, coal mines, laboratories and medical facilities where airborne infection occurs. Therefore, in order to prevent such accidents, workers' health is protected from a harmful environment by wearing a respirator. Examples of a mask used for such purpose may include a product provided with a purifying material, a product with a built-in filter, or the like.

On such a work site as described above, the mask as a last means to protect the respiratory organ must be worn. Employers of most industrial sites in Korea must supply a mask suitable for each worker.

In particular, as industrial accidents caused by leakage of fine dust or noxious gas have increased, awareness of such condition and importance of wearing the mask is also increasing with each passing day.

However, in reality, only standardized masks are provided in Korea. Therefore, in order to solve inconvenience of workers wearing the masks not fitted with different face shapes or sizes, fittingness test for a respiratory protective device is further required.

In order to adapt the fittingness test, it is necessary to implement a test supported by an objective numerical value, which was calculated as a fittingness coefficient by wearing a mask to find a desired mask exactly fitting with the face shape or size of each worker and measuring air quality (measurement of dust coefficient) inside and outside the mask to thus calculate the fittingness coefficient. For this purpose, the mask is perforated, and a metal structure is provided on both sides of the perforation and is connected with a cylindrical tube. Then, opposite the tube, a device for measuring substances in the air ("air substance measuring device") is connected and the air inside the mask is transferred to the measuring device through the tube.

In this regard, the mask is subjected to perforation to mount the metal structure. However, a drill used for perforation may injure a user's hand during drilling. In other words, it is common that a user perforates the mask using a drill with one hand while grasping the mask with the other hand. In this process, a sharp end of the drill may possibly pierce the hand holding the mask if not careful.

In addition, in order to mount the metal structure, the mask should be firstly perforated, followed by mounting the metal structure through a perforation formed in the mask. In this case, the user must conduct two steps of perforating the mask and mounting the metal structure through a perforation. Consequently, adding metal structures to a number of masks is time-consuming and cumbersome for users.

DISCLOSURE

Technical Problem

An embodiment of the present invention is to provide a coupling device for a mask test means that may prevent a user from being injured when the user joins the mask test means to a mask.

Further, another embodiment of the present invention is to provide a coupling device for testing a mask that can easily couple the mask test means to a mask.

Technical Solution

According to one embodiment of the present invention, there is provided a coupling device for a mask test means, including: a press member capable of accommodating a first member of the mask test means at one side of the press member and being movable up and down; and a support member capable of accommodating a second member of the mask test means at one side of the support member and being disposed below the press member, wherein the support member includes a lower member on which a perforation means capable of perforating the mask is formed, and the press member includes an upper member into which at least a portion of the perforation means may be inserted.

The mask may be disposed between the lower member and the upper member.

The press member may include an upper guide while the support member may include a lower guide, and the upper guide may move along the lower guide.

The upper member may include: a first space in which at least a portion of the perforation means is inserted; and a first outer wall formed outside the first space.

The lower member may include: a second space in which at least a portion of the first outer wall is accommodated; and a second outer wall formed outside the second space.

Further, an elastic means to apply restoring force to at least one of the upper guide and the lower guide.

The press member may include a press bar, and the press bar may be provided with a plurality of protrusions.

The support member may include a base part, and a plurality of contact parts may be formed on the bottom of the base part.

Advantageous Effects

One embodiment of the present invention may provide a coupling device for a mask test means that can prevent a user from being injured when the user joins the mask test means to a mask.

Another embodiment of the present invention may provide a coupling device for a mask test means that can easily couple the mask test means to a mask.

BEST MODE

According to the most preferred embodiment of the present invention, a coupling device for a mask test means may include: a press member capable of accommodating a first member of the mask test means at one side of the press member and being movable up and down; and a support member capable of accommodating a second member of the mask test means on one side of the support member and being disposed below the press member, wherein the support member includes a lower member on which a perforation means capable of perforating the mask is formed, and the press member includes an upper member into which at least a portion of the perforation means is inserted.

PREFERRED EMBODIMENT OF INVENTION

Hereinafter, specific embodiments of the present invention will be described with reference to the drawings. However, this is merely an example and the present invention is not limited thereto.

In the following description, a detailed description of known functions and configurations incorporated herein will be omitted when it may make the subject matter of the present invention rather unclear. The following terms are defined in consideration of the functions of the present invention, and may be altered in accordance with custom and/or the intention of the user or operator, and the like. Therefore, the definition used herein should be based on the contents throughout this specification.

The technical idea of the present invention is determined by the appended claims, and the following embodiments are merely an expedient to effectively explain the technical idea of the present invention to persons having ordinary skill in the art to which the present invention belongs ("those skilled in the art").

In addition, although a cross-section of each of different type tube structures is assumed to be circular in order to explain one embodiment, the present invention is duly not limited to the above. In other words, it may be of course understood that the present invention can be modified into various embodiments as long as it can form a flow of fluid.

Figure 1:
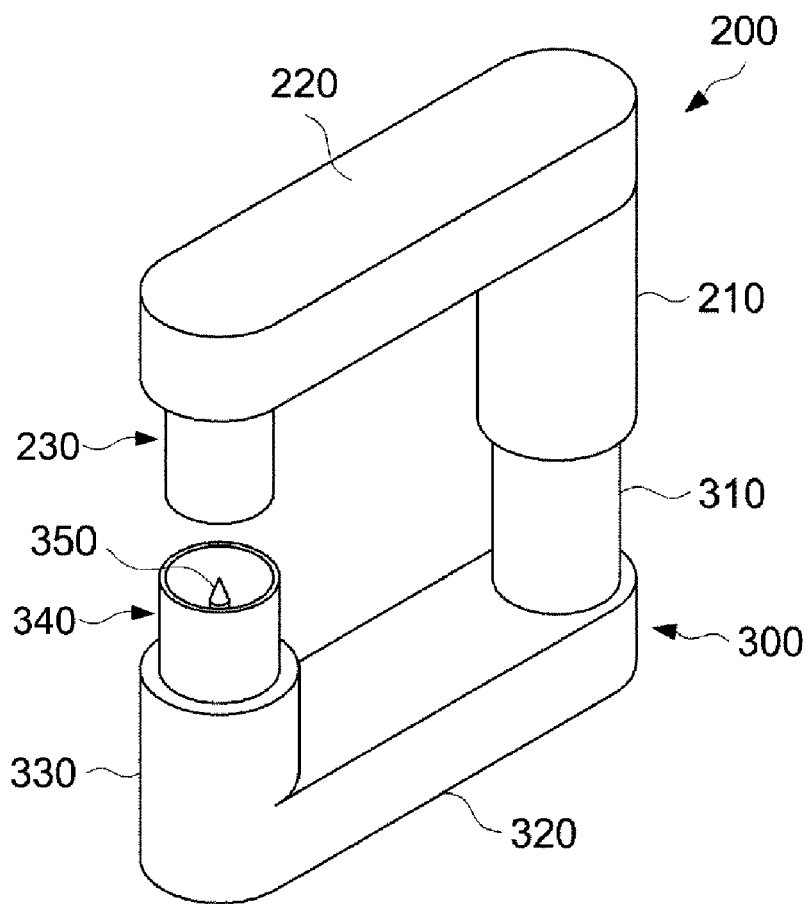
FIG. 1 is a perspective view illustrating the coupling device for a mask test means according to an embodiment of the present invention.

FIG. 1 is a perspective view illustrating a coupling device 100 for a mask test means ("coupling device") according to an embodiment of the present invention.

The coupling device 100 may include a press member 200 disposed on an upper side and a support member 300 disposed on a lower side thereof. The press member 200 may include an upper guide 210, a press bar 220 and an upper member 230, while the support member 300 may include a lower guide 310, a base part 320, a support bar 330 and a lower member 340.

The press member 200 may be configured to accommodate and hold a first member 500a of the mask test means at one side thereof. Further, the press member 200 may be configured to move downward by pressing the same and also move upward to restore to the original state through elastic force.

The support member 300 may be configured to accommodate and hold a second member 500b of the mask test means at one side thereof. Further, the support member 300 is disposed below the press member 200 to thus lead to coupling between the first member 500a and the second member 500b of the mask test means. The coupling of the mask test means may be performed by inserting a portion of the second member 500b into a hole in the first member 500a, wherein the first member 500a and the second member 500b are coupled while placing a mask 400 therebetween, and in a state in which the first member 500a and the second member 500b are disposed on both sides of the mask 400.

In order to insert the second member 500b into the hole formed in the first member 500a, the mask 400 should be perforated. To this end, a perforation means 350 may be present inside the lower member 340 of the support member 300. The perforation means 350 may have a variety of shapes to perforate the mask, for example, a drill form with a sharp-pointed end.

The press member 200 may include the upper member 230 and, when the press member 200 moves downward by pressing the same, at least a portion of the upper member 230 may be inserted inside the lower member 340. As at least a portion of the upper member 230 is inserted inside the lower member 340 provided with the perforation means 350, the mask is perforated and, at the same time, the first member 500a and the second member 500b in the mask test means are coupled, thereby being mounted on the mask 400.

The upper guide 210 of the press member 200 is intercoupled with the lower guide 310 of the support member 300 so that the upper guide 210 may move up and down along the lower guide 310. For instance, the upper guide 210 and the lower guide 310 may have a cylindrical shape, wherein the upper guide 210 has a larger diameter than that of the lower guide 310. The upper guide 210 may be configured to move along the lower guide 310 in a state in which a portion of the lower guide 310 is inserted into the upper guide 210.

The press member 200 may include a press bar 220 to be pressed by a user, in addition to the upper member 230 formed at one side of the press bar 220 and the upper guide 210 formed at the other side thereof. The support member 300 may include a base part 320 to stand the support member on a flat surface such as a floor, wherein the base part 320 is provided with a support bar 330 to support the lower member 340 at one side while having the lower guide 310 formed on the other side thereof.

Figure 2:
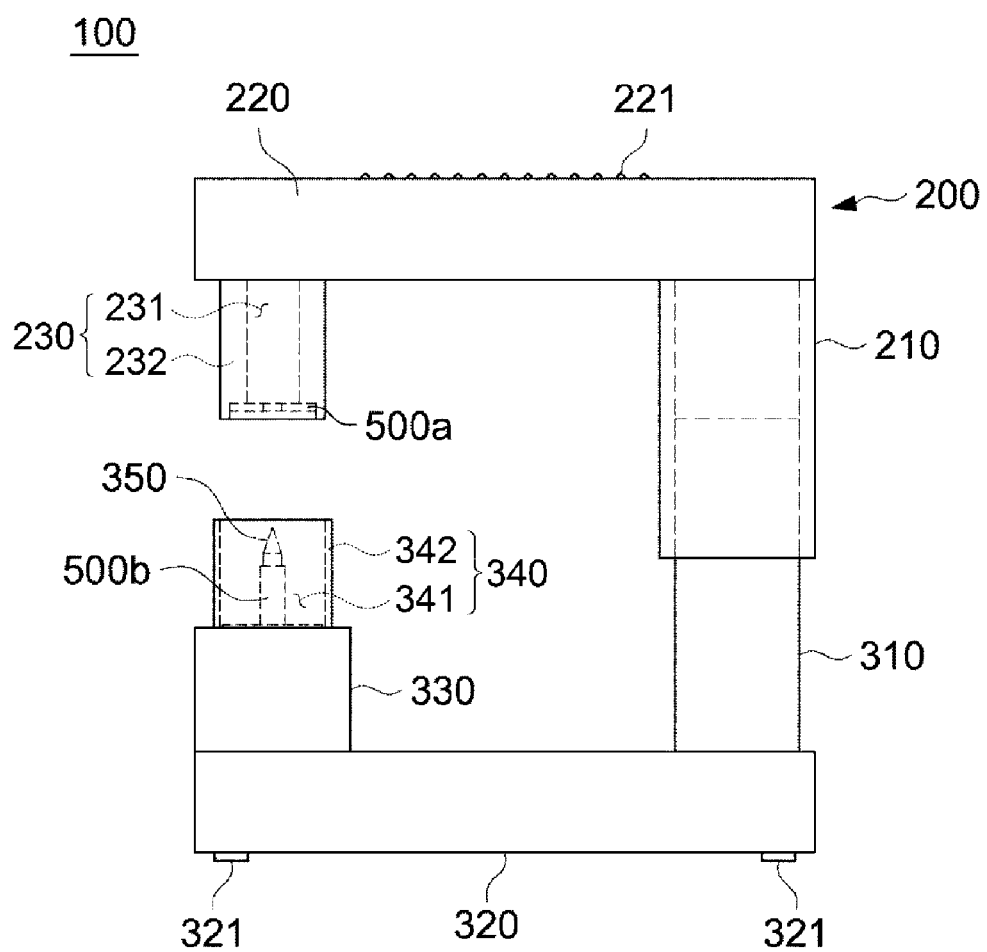
FIG. 2 is a cross-sectional view illustrating the coupling device for a mask test means according to an embodiment of the present invention, wherein a first member and a second member of the mask test means are accommodated.

FIG. 2 is a cross-sectional view illustrating the coupling device 100 for a mask test means ("coupling device") according to an embodiment of the present invention, wherein the first member 500a and the second member 500b of the mask test means are accommodated.

Referring to FIG. 2, the upper member 230 included in the press member 200 of the coupling device 100 may include a first space 231 into which at least a portion of the perforation means 350 for perforating the mask 400 is inserted; as well as a first outer wall 232 formed outside the first space 231. Below the first space 231, the first member 500a of the mask test means may be accommodated. More particularly, a stepped part may be formed on a lower side of the first space 231, and the first member 500a may be positioned on the stepped part. A diameter of the first space 231 may be smaller than an overall diameter of the first member 500a so that the first member 500a can be held on the bottom of the first space 231.

The lower member 340 of the support member 300 may include a second space 341 to accommodate at least a portion of the first outer wall 232 in the upper member 230, and a second outer wall 342 formed outside the second space 341. A diameter of the second space 341 may be larger than an overall diameter of the first outer wall 232 so that the first outer wall 232 can be accommodated inside the second space 341.

The second member 500b in the mask test means may be fitted to the perforation means 350 formed at the center of the lower member 340. As the second member 500b is fitted to the perforation means 350 and is held thereon and the press member 200 moves downward, the first member 500a held on the bottom of the first space 231 may also move downward, thereby coupling the first member 500a and the second member 500b while placing the mask 400 therebetween.

At least one of the upper guide 210 and the lower guide 310 disposed on the opposite side to the upper member 230 and the lower member 340, respectively, may be provided with an elastic means to provide restoring force (not shown). The elastic means may serve to move the press member 200, which has moved downward by pressing the same, upward so as to restore to the original position before pressing the press member 200. Further, in order to prevent the press member 200 from moving regardless of the user's intention, a switch 211 may be provided on one side of the upper guide 210. In a state of not pushing the switch 211, migration between the upper guide 210 and the lower guide 310 is restricted. On the other hand, in case of pushing the switch 211, migration between the upper guide 210 and the lower guide 310 may be performed.

The press member 200 may be provided with a plurality of protrusions 221 on the press bar 220. The protrusion 221 may apply frictional force to the user's hand and facilitate the user to press the press bar 220.

A plurality of contact parts 321 may be formed on the bottom of the base part 320 in the support member 300. The contact part 321 may apply predetermined frictional force to prevent the whole coupling device 100 from undesirably shaking when the user presses the press member 200. In addition, the contact part 321 may afford desired cushioning effects to a flat surface such as a floor on which the coupling device 100 is placed, so that the user can smoothly press the press member 200.

Figure 3:
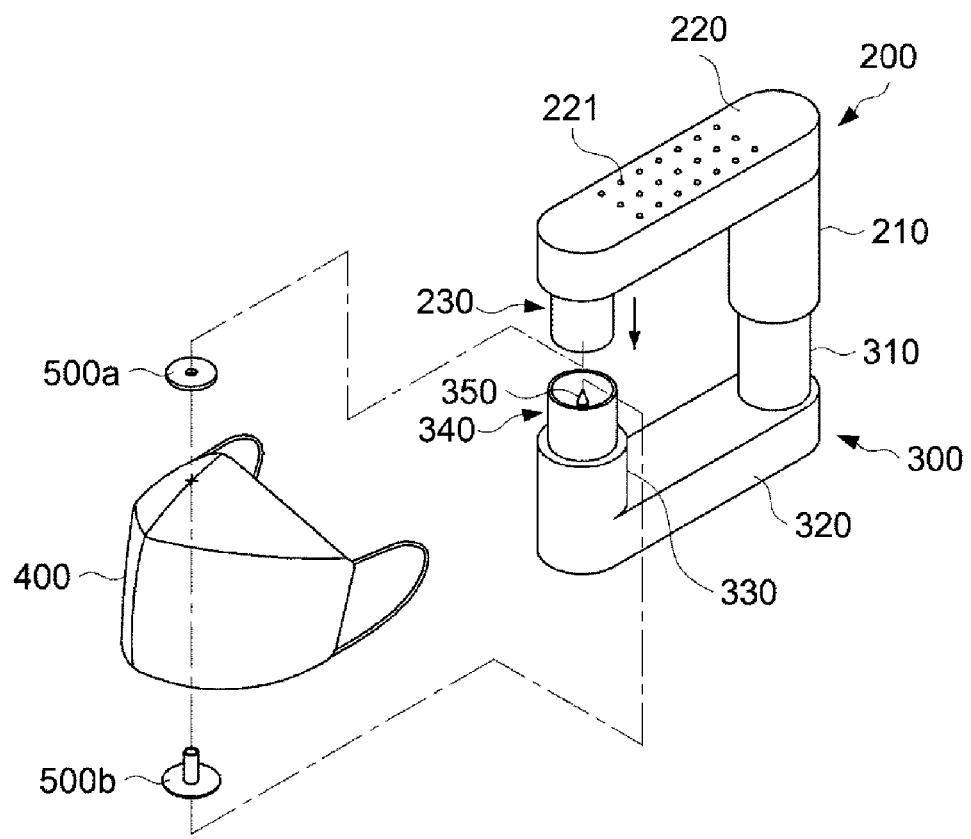
FIG. 3 illustrates the mask test means coupled to a mask according to the coupling device for a mask test means according to an embodiment of the present invention.

FIG. 3 illustrates the mask coupling means 500a, 500b coupled to a mask 400 according to the coupling device 100 for a mask test means according to an embodiment of the present invention.

Referring to FIG. 3, in a state wherein the mask 400 is interposed between the upper member 230 and the lower member 340, the first member 500a of the mask test means is disposed on the upper member 230 while placing the second member 500b of the mask test means on the lower member 340. In this case, when the press bar 220 of the press member 200 is pressed, the upper member 230 may move downward to thus insert the upper member 230 inside the lower member 340. Herein, as the perforation means 350 perforates the mask 400, a portion of the second member 500b in the mask test means may pass through a hole at the center of the first member 500a in the mask test means via a perforation formed in the mask 400. When pressing the press bar 220 of the press member 200 to the maximum, the first member 500a and the second member 500b are brought into close contact with each other, thereby being coupled together while placing the mask 400 therebetween.

Using the coupling device 100 for a mask test means, the user can safely conduct a mask test without a problem of being injured when attaching a mask to the mask test means. In addition, since drilling a hole in the mask and attaching the mask to the mask test means through the hole are performed by a single operation, the mask test means can be attached to the mask more easily than before. That is, according to one embodiment of the present invention, perforating the mask and attaching the mask test means to the mask may be performed at once by a single and simple operation of pressing the press member 200.

As such, the present invention has been particularly illustrated and described with reference to exemplary embodiments thereof. However, those skilled in the art would understand that diverse modifications may be possible with regard to the above embodiments without departing from the scope of the present invention. Therefore, it is to be understood that the scope of the present invention is not limited to the disclosed exemplary embodiments but should be defined by the appended claims, as well as equivalents to the appended claims.

The invention claimed is:

1. A coupling device for a mask test means, comprising:
a press member capable of accommodating a first member of the mask test means at one side of the press member and being movable up and down; and
a support member capable of accommodating a second member of the mask test means at one side of the support member and being disposed below the press member,
wherein the support member includes a lower member on which a perforation means capable of perforating the mask is formed, and the press member includes an upper member into which at least a portion of the perforation means is inserted.

2. The coupling device according to claim 1, wherein the mask is positioned between the lower member and the upper member.

3. The coupling device according to claim 1, wherein the press member includes an upper guide and the support member includes a lower guide, wherein the upper guide is movable along the lower guide.

4. The coupling device according to claim 1, wherein the upper member includes: a first space into which at least a portion of the perforation means is inserted; and a first outer wall formed outside the first space.

5. The coupling device according to claim 4, wherein the lower member includes: a second space in which at least a portion of the outer wall is accommodated; and a second outer wall formed outside the second space.

6. The coupling device according to claim 3, further comprising an elastic means included in at least one of the upper guide and the lower guide, in order to provide restoring force.

7. The coupling device according to claim 1, wherein the press member includes a press bar, and the press bar is provided with a plurality of protrusions.

8. The coupling device according to claim 1, wherein the support member is provided with a base part and a plurality of contact parts formed on a bottom of the base part.

* * * * *